United States Patent
Franklin et al.

(10) Patent No.: US 6,547,309 B1
(45) Date of Patent: Apr. 15, 2003

(54) SECURING DEVICE FOR CONTENTS OF A WHEELBARROW

(76) Inventors: Omar C. Franklin, 1949 Rockville Rd., Suisun City, CA (US) 94585; Pamela R. Ellman, 1949 Rockville Rd., Suisun City, CA (US) 94585

( * ) Notice: Subject to any disclaimer, the term of this patent is extended or adjusted under 35 U.S.C. 154(b) by 97 days.

(21) Appl. No.: 09/881,887

(22) Filed: Jun. 15, 2001

(51) Int. Cl.[7] .................................................. B62B 1/00
(52) U.S. Cl. ...................................... 296/98; 280/47.31
(58) Field of Search ........................ 296/98; 280/47.31, 280/653; 298/2, 3

(56) References Cited

U.S. PATENT DOCUMENTS

| | | |
|---|---|---|
| 2,341,160 A | * 2/1944 | Osgood |
| 5,207,260 A | 5/1993 | Commesso |
| 5,452,973 A | 9/1995 | Arvin |
| 5,772,370 A | 6/1998 | Moore |
| 5,803,391 A | 9/1998 | Saperstein et al. |
| 5,839,772 A | 11/1998 | Toole |
| D411,506 S | 6/1999 | Davis |

* cited by examiner

*Primary Examiner*—Joseph D. Pape

(57) ABSTRACT

A securing device for contents of a wheelbarrow for preventing the content of a wheelbarrow from falling out of the wheelbarrow. The securing device for contents of a wheelbarrow includes a generally flexible panel having a first end edge and a second end edge. A first hook is attached to the first end edge. A tubular member has a first end and a second end. A slot extends through a peripheral wall of the tubular member. A spindle is rotatably mounted in the tubular member. The second end edge extends through the slot and is attached to the spindle. A second hook is attached to the tubular member. The first and second hooks are attached to the upper edge of a wheelbarrow such that the panel is extended over the wheelbarrow.

7 Claims, 2 Drawing Sheets

SECURING DEVICE FOR CONTENTS OF A WHEELBARROW

BACKGROUND OF THE INVENTION

1. Field of the Invention

The present invention relates to cargo securing members and more particularly pertains to a new securing device for contents of a wheelbarrow for preventing the content of a wheelbarrow from falling out of the wheelbarrow.

2. Description of the Prior Art

The use of cargo securing members is known in the prior art. More specifically, cargo securing members heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,803,391; 5,839,772; 5,207,260; 5,772,370; 5,452,973; and 411,506.

While these devices fulfill their respective, particular objectives and requirements, the aforementioned patents do not disclose a new securing device for contents of a wheelbarrow. The inventive device includes a generally flexible panel having a first side edge, a second side edge, a first end edge and a second end edge. A first hook is attached to and extends along a length of the first end edge. A tubular member has a first end and a second end. A slot extends through a peripheral wall of the tubular member and between the first and second ends. A spindle is rotatably mounted in the tubular member and has a longitudinal axis orientated generally parallel to a longitudinal axis of the tubular member. The spindle is rotatably coupled to and extends between the first and second ends. The second end edge extends through the slot and is attached to the spindle. A second hook is attached to and extends along a length of the tubular member. The first and second hooks are attached to the upper edge of a wheelbarrow such that the panel is extended over the wheelbarrow.

In these respects, the securing device for contents of a wheelbarrow according to the present invention substantially departs from the conventional concepts and designs of the prior art, and in so doing provides an apparatus primarily developed for the purpose of preventing the content of a wheelbarrow from falling out of the wheelbarrow.

SUMMARY OF THE INVENTION

In view of the foregoing disadvantages inherent in the known types of cargo securing members now present in the prior art, the present invention provides a new securing device for contents of a wheelbarrow construction wherein the same can be utilized for preventing the content of a wheelbarrow from falling out of the wheelbarrow.

The general purpose of the present invention, which will be described subsequently in greater detail, is to provide a new securing device for contents of a wheelbarrow apparatus and method which has many of the advantages of the cargo securing members mentioned heretofore and many novel features that result in a new securing device for contents of a wheelbarrow which is not anticipated, rendered obvious, suggested, or even implied by any of the prior art cargo securing members, either alone or in any combination thereof.

To attain this, the present invention generally comprises a generally flexible panel having a first side edge, a second side edge, a first end edge and a second end edge. A first hook is attached to and extends along a length of the first end edge. A tubular member has a first end and a second end. A slot extends through a peripheral wall of the tubular member and between the first and second ends. A spindle is rotatably mounted in the tubular member and has a longitudinal axis orientated generally parallel to a longitudinal axis of the tubular member. The spindle is rotatably coupled to and extends between the first and second ends. The second end edge extends through the slot and is attached to the spindle. A second hook is attached to and extends along a length of the tubular member. The first and second hooks are attached to the upper edge of a wheelbarrow such that the panel is extended over the wheelbarrow.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new securing device for contents of a wheelbarrow apparatus and method which has many of the advantages of the cargo securing members mentioned heretofore and many novel features that result in a new securing device for contents of a wheelbarrow which is not anticipated, rendered obvious, suggested, or even implied by any of the prior art cargo securing members, either alone or in any combination thereof.

It is another object of the present invention to provide a new securing device for contents of a wheelbarrow which may be easily and efficiently manufactured and marketed.

It is a further object of the present invention to provide a new securing device for contents of a wheelbarrow which is of a durable and reliable construction.

An even further object of the present invention is to provide a new securing device for contents of a wheelbarrow which is susceptible of a low cost of manufacture with regard to both materials and labor, and which accordingly is then susceptible of low prices of sale to the consuming public, thereby making such securing device for contents of a wheelbarrow economically available to the buying public.

Still yet another object of the present invention is to provide a new securing device for contents of a wheelbarrow which provides in the apparatuses and methods of the prior art some of the advantages thereof, while simultaneously overcoming some of the disadvantages normally associated therewith.

Still another object of the present invention is to provide a new securing device for contents of a wheelbarrow for preventing the content of a wheelbarrow from falling out of the wheelbarrow.

Yet another object of the present invention is to provide a new securing device for contents of a wheelbarrow which includes a generally flexible panel having a first side edge, a second side edge, a first end edge and a second end edge. A first hook is attached to and extends along a length of the first end edge. A tubular member has a first end and a second end. A slot extends through a peripheral wall of the tubular member and between the first and second ends. A spindle is rotatably mounted in the tubular member and has a longitudinal axis orientated generally perpendicular to a longitudinal axis of the tubular member. The spindle is rotatably coupled to and extends between the first and second ends. The second end edge extends through the slot and is attached to the spindle. A second hook is attached to and extends along a length of the tubular member. The first and second hooks are attached to the upper edge of a wheelbarrow such that the panel is extended over the wheelbarrow.

Still yet another object of the present invention is to provide a new securing device for contents of a wheelbarrow that has an extendable and retractable length for fitting various wheelbarrows and for covering heaping contents of the wheelbarrow.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
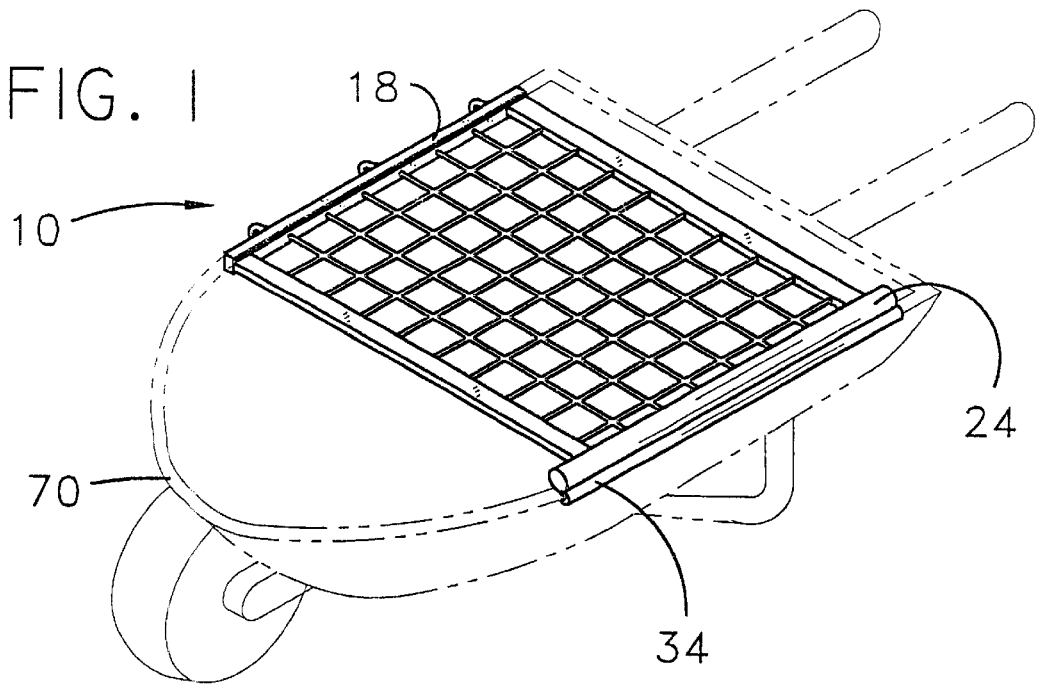
FIG. 1 is a schematic perspective view of a new securing device for contents of a wheelbarrow according to the present invention.
Figure 2:
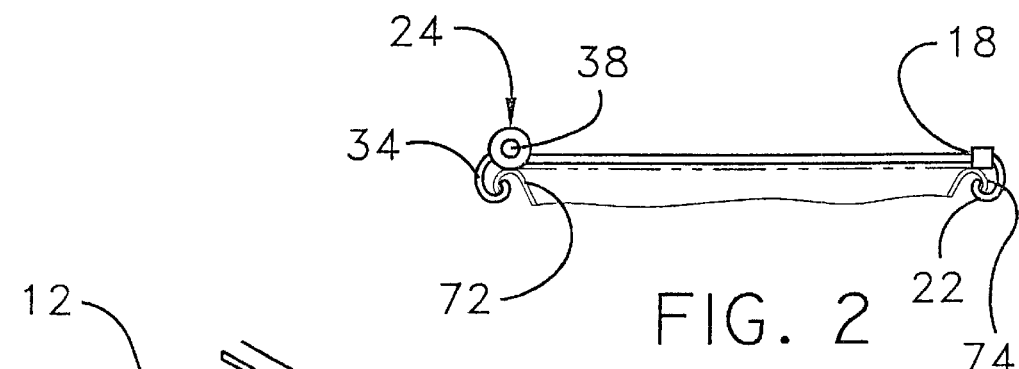
FIG. 2 is a schematic side view of the present invention.
Figure 3:
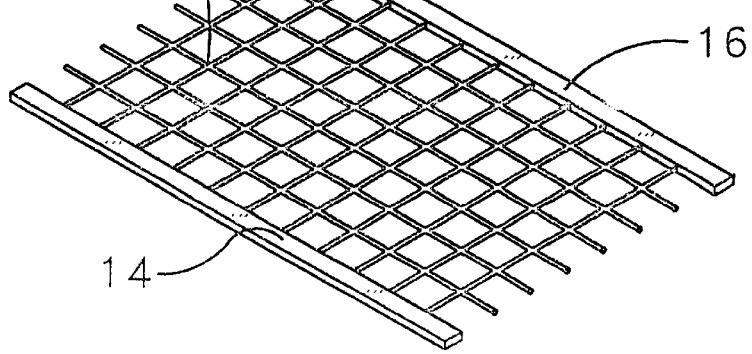
FIG. 3 is a schematic perspective view of the present invention.

With reference now to the drawings, and in particular to FIGS. 1 through 4 thereof, a new securing device for contents of a wheelbarrow embodying the principles and concepts of the present invention and generally designated by the reference numeral 10 will be described.

As best illustrated in FIGS. 1 through 4, the securing device for contents of a wheelbarrow 10 generally comprises a device for detachably positioning on opposite upper edges 72 of a wheelbarrow 70 such that the device extends over contents of the wheelbarrow 70. Preferably the upper edge has a lip 74.

The device 10 includes a generally flexible panel 12 having a first side edge 14, a second side edge 16, a first end edge 18 and a second end edge 20. A first hook 22 is attached to and extends along a length of the first end edge 18. The panel 12 preferably comprises a mesh material or netting.

A tubular member 24 has a first end 26 and a second end 28. A slot 30 extends through a peripheral wall of the tubular member 24 and generally between the first 26 and second 28 ends. A spindle 32 is rotatably mounted to mountings 33 in the tubular member 24. The spindle 32 has a longitudinal axis orientated generally parallel to a longitudinal axis of the tubular member 24. The second end edge 20 extends through the slot 30 and is attached to the spindle 32. A second hook 34 is attached to and extends along a length of the tubular member 24. The first 22 and second 34 hooks looping toward each other.

A biasing means 36 biases rotation of the spindle 32 in a first direction. The flexible panel 12 is wound up on the spindle 32 and drawn into the tubular member 24 when the spindle 32 rotates in the first direction. The biasing means 36 comprises a spring wound about the spindle 32 and attached to the tubular member 24 and the spindle 32.

Figure 4:
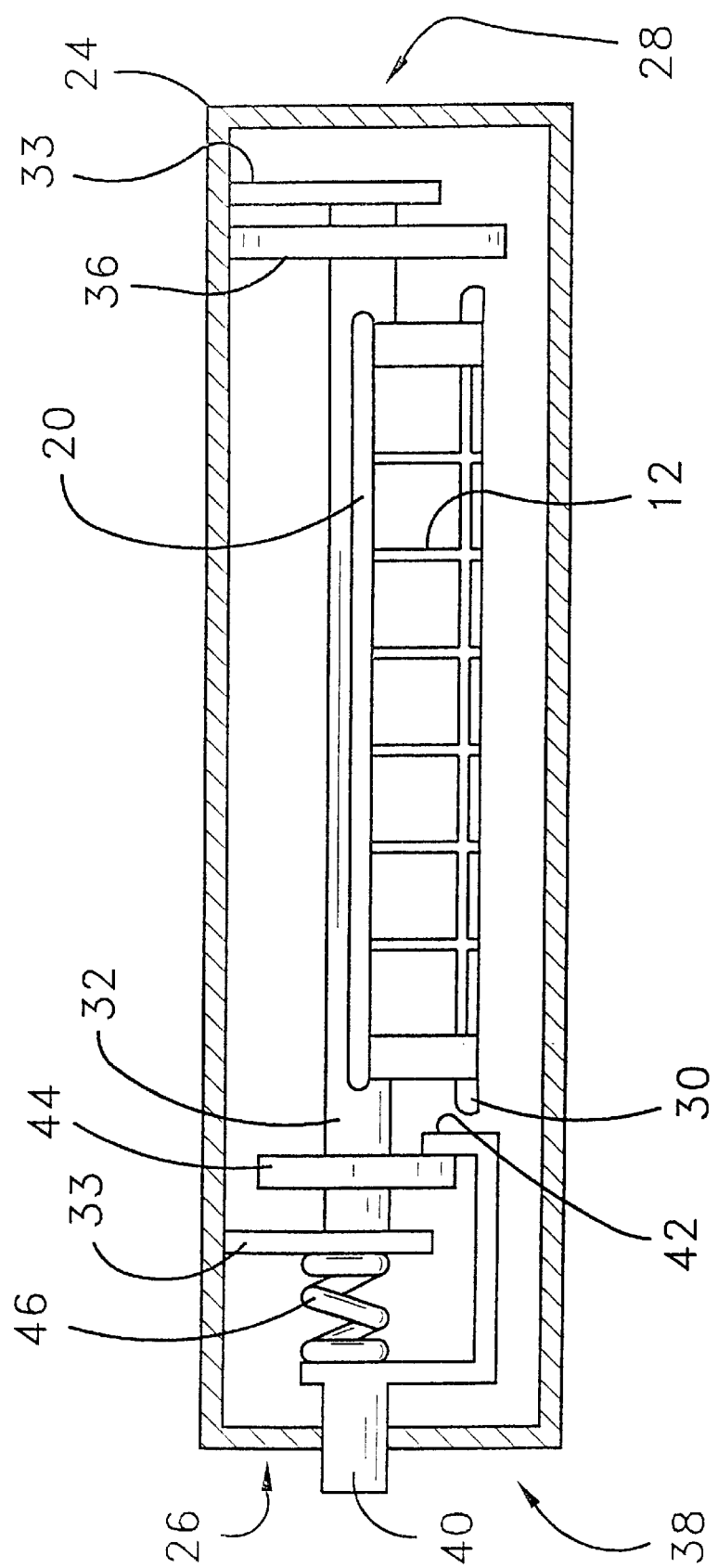
FIG. 4 is a schematic cross-sectional view of the present invention.

A locking means 38 selectively prevents rotation of the spindle 32. An embodiment of the locking means 38 is depicted in FIG. 4 and comprises a rod 40 extending into the first end 26 of the tubular member 24. The rod 40 has a foot 42 thereon for abutting a disc 44 positioned on the spindle 32. An urging means 46 urges, comprising a compression spring, the foot 42 against the disc 44 for frictionally engaging the disc 44. The foot 44 is moved away from the disc 44 when it is depressed such that the spindle 32 may rotate.

In use, the first 22 and second 34 hooks are attached to the upper edge 72 of the wheelbarrow 70 such that the panel 12 is extended over the wheelbarrow 70. The device 10 helps to prevent any materials being carried in the wheelbarrow 70 from falling out of the wheelbarrow.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A securing device for detachably positioning on opposite upper edges of a wheelbarrow such that said device extends over contents of the wheelbarrow, said device comprising:

a generally flexible panel having a first side edge, a second side edge, a first end edge and a second end edge, a first hook being attached to and extending along a length of said first end edge;

a tubular member having a first end and a second end, a slot extending through a peripheral wall of said tubular member and between said first and second ends, a spindle being rotatably mounted in said tubular member, said spindle having a longitudinal axis orientated generally perpendicular to a longitudinal axis of said tubular member, said second end edge extending through said slot and being attached to said spindle, a second hook being attached to and extending along a length of said tubular member; and wherein said first and second hooks are attached to the upper edge of the wheelbarrow such that said panel is extended over the wheelbarrow.

2. The securing device as in claim 1, wherein said panel comprises a mesh material.

3. The securing device as in claim 1, further including a biasing means for biasing rotation of said spindle in a first direction, said flexible panel being wound up on said spindle and drawn into said tubular member when said spindle rotates in said first direction.

4. The securing device as in claim 3, further including a locking means for selectively preventing rotation of said spindle.

5. The securing device as in claim 4, wherein said locking means comprises a rod extending into said first end of said tubular member, said rod having a foot thereon for abutting a disc positioned on said spindle, an urging means urges said foot against said disc for frictionally engaging said disc, said foot, said foot moving away from said disc when said rod is depressed into said tubular member.

6. A securing device for detachably positioning on opposite upper edges of a wheelbarrow such that said device extends over contents of the wheelbarrow, said device comprising:

a generally flexible panel having a first side edge, a second side edge, a first end edge and a second end edge, a first hook being attached to and extending along a length of said first end edge, said panel comprising a mesh material;

a tubular member having a first end and a second end, a slot extending through a peripheral wall of said tubular member and between said first and second ends, a spindle being rotatably mounted in said tubular member, said spindle having a longitudinal axis orientated generally perpendicular to a longitudinal axis of said tubular member, said second end edge extending through said slot and being attached to said spindle, a second hook being attached to and extending along a length of said tubular member;

a biasing means for biasing rotation of said spindle in a first direction, said flexible panel being wound up on said spindle and drawn into said tubular member when said spindle rotates in said first direction, said biasing means comprising a spring;

a locking means for selectively preventing rotation of said spindle, said locking means comprising a rod extending into said first end of said tubular member, said rod having a foot thereon for abutting a disc positioned on said spindle, an urging means urges said foot against said disc for frictionally engaging said disc; and wherein said first and second hooks are attached to the upper edge of the wheelbarrow such that said panel is extended over the wheelbarrow.

7. A securing system for a wheelbarrow comprising:

a wheelbarrow having an upper edge having a lip thereon;

a generally flexible panel having a first side edge, a second side edge, a first end edge and a second end edge, a first hook being attached to and extending along a length of said first end edge, said panel comprising a mesh material;

a tubular member having a first end and a second end, a slot extending through a peripheral wall of said tubular member and between said first and second ends, a spindle being rotatably mounted in said tubular member, said spindle having a longitudinal axis orientated generally perpendicular to a longitudinal axis of said tubular member, said second end edge extending through said slot and being attached to said spindle, a second hook being attached to and extending along a length of said tubular member;

a biasing means for biasing rotation of said spindle in a first direction, said flexible panel being wound up on said spindle and drawn into said tubular member when said spindle rotates in said first direction, said biasing means comprising a spring;

a locking means for selectively preventing rotation of said spindle, said locking means comprising a rod extending into said first end of said tubular member, said rod having a foot thereon for abutting a disc positioned on said spindle, an urging means urges said foot against said disc for frictionally engaging said disc; and wherein said first and second hooks are attached to the lip of the wheelbarrow such that said panel is extended over the wheelbarrow.

* * * * *